United States Patent [19]

Tamazawa et al.

[11] 3,967,929
[45] July 6, 1976

[54] EXHAUST GAS PURIFYING SYSTEM

[75] Inventors: Tsuyoshi Tamazawa; Hiroshi Yaguchi, both of Yokohama, Japan

[73] Assignee: Nissan Motor Co., Ltd., Japan

[22] Filed: Jan. 8, 1974

[21] Appl. No.: 431,606

[30] Foreign Application Priority Data
Jan. 13, 1973  Japan.................................. 48-6832

[52] U.S. Cl............................ 23/288 F; 23/288 FB;
23/288 FC; 23/288 K; 60/286; 60/289;
60/298; 60/299; 60/306
[51] Int. Cl.²...................... B01J 8/04; F01N 3/15;
B01J 8/02; B01J 8/00
[58] Field of Search ...... 23/288 FC, 288 FB, 288 F;
60/286, 289, 306, 298, 299

[56] References Cited
UNITED STATES PATENTS

| | | | |
|---|---|---|---|
| 1,789,812 | 1/1931 | Frazer...................... | 23/288 FC UX |
| 3,180,712 | 4/1965 | Humblin.......................... | 23/288 FB |
| 3,441,381 | 4/1969 | Keith et al...................... | 23/288 FC |
| 3,665,711 | 5/1972 | Muroki................................ | 60/286 |
| 3,730,691 | 5/1973 | Lang et al............... | 23/288 FC UX |
| 3,733,181 | 5/1973 | Tourtellotte et al. .... | 23/288 FB UX |
| 3,733,829 | 5/1973 | Henault.................... | 23/288 FB UX |
| 3,751,916 | 8/1973 | Hayashida et al. ............... | 60/298 X |
| 3,785,781 | 1/1974 | Hervert et al.................... | 23/288 FB |
| 3,808,806 | 5/1974 | Nakamura et al. ...... | 23/288 FC UX |
| 3,812,673 | 5/1974 | Muroki et al...................... | 60/298 X |
| 3,813,226 | 5/1974 | Heitland et al........... | 23/288 FB UX |
| 3,817,714 | 6/1974 | Wiley.............................. | 23/288 FC |
| 3,820,327 | 6/1974 | Henault .................. | 60/286 |
| 3,832,443 | 8/1974 | Hass............................ | 23/288 FB X |

FOREIGN PATENTS OR APPLICATIONS

| | | | |
|---|---|---|---|
| 45-15766 | 6/1970 | Japan..................................... | 60/298 |
| 283,730 | 10/1970 | U.S.S.R................................. | 60/298 |

*Primary Examiner*—Barry S. Richman
*Attorney, Agent, or Firm*—Robert E. Burns; Emmanuel J. Lobato; Bruce L. Adams

[57] ABSTRACT

Air is pumped into the engine exhaust manifold to promote oxidation of unburned remnants in exhaust gas when the temperature in a catalytic converter is below a safe level. The air supply to the exhaust manifold is shut off and air is pumped into the catalytic converter to cool it if the temperature goes above the safe level. The catalytic converter includes a catalytic means, having an outer periphery, which is resiliently supported away from the inner circumference of the converter casing. Upon the catalytic means reaching a predetermined maximum temperature, air is pumped into the annular space located between the outer periphery of the catalytic means, which may comprise either a particulate or a monolithic catalyst, and the inner circumference of the casing. The annular space communicates with both an exhaust gas inlet chamber located upstream of the catalytic means and an exhaust gas outlet chamber located downstream of the catalytic means, for cooling the catalyst therein to prevent degradation of said catalyst.

10 Claims, 5 Drawing Figures

EXHAUST GAS PURIFYING SYSTEM

BACKGROUND OF THE INVENTION

The present invention relates to an exhaust gas purifying system for an internal combustion engine.

It is well known to have an exhaust system of an internal combustion engine equipped with a catalytic converter containing an oxidation catalyst to purify engine exhaust gases. It has also been a common practice to supply air upstream of the catalytic converter for promoting oxidation of unburned constituents of engine exhaust gases. During oxidation of unburned constituents in the catalytic converter, the catalyst is frequently exposed to unduly high temperature, and requires frequent replacement.

In order to overcome this shortcoming encountered in the prior art, it has heretofore been proposed to temporarily interrupt the supply of air into the catalytic converter to control the reaction between the oxidizable constituents of the exhaust gases and the oxygen in the air to prevent an excessive rise in the operating temperature of the catalytic converter. In this prior art, cooling of the catalytic converter is achieved naturally, and the catalytic converter is not cooled down to a desired temperature within a short period of time.

In addition, during interruption of the supply of air into the catalytic converter, gases are purified insufficiently in the catalytic converter because of insufficient oxygen for the reaction with the oxidizable constituents of the engine exhaust gases.

SUMMARY OF THE INVENTION

It is accordingly an important object of the present invention to provide an improved exhaust gas purifying system which protects a catalytic converter from excessive high temperature to prevent degeneration of catalytic activity and warpage of the catalytic converter structure.

It is another important object of the present invention to provide an improved exhaust gas purifying system in which a catalytic converter is cooled by forced air when the temperature of the catalytic converter rises to an undesirably high level.

It is further important object of the present invention to provide an improved exhaust gas purifying system in which during interruption of the supply of air upstream of a catalytic converter, oxidizable constituents of exhaust gases are oxidized downstream of the catalytic converter by introducing air thereinto.

BRIEF DESCRIPTION OF THE DRAWINGS

These and other objects and advantages of the present invention will become more apparent from the following description when taken in conjunction with the attached drawings, in which.

DESCRIPTION OF THE PREFERRED EMBODIMENTS

Figure 1:
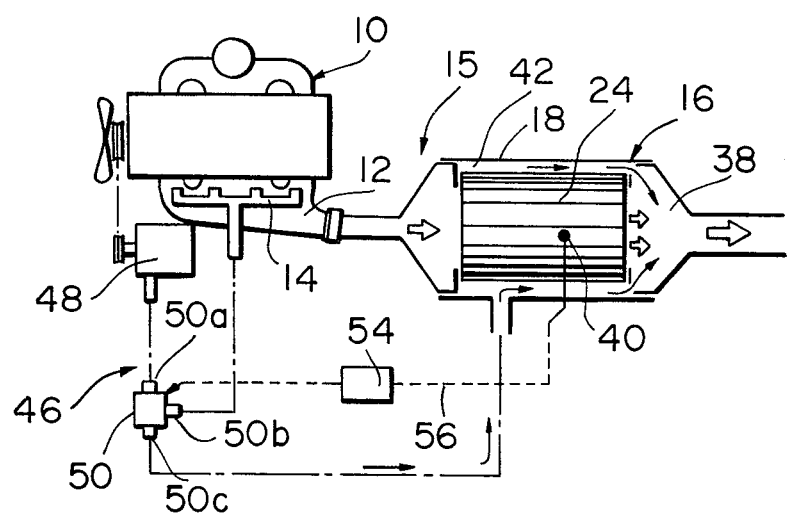
FIG. 1 is a schematic representation of an internal combustion engine equipped with an exhaust gas purifying system embodying the present invention.
Figure 2:
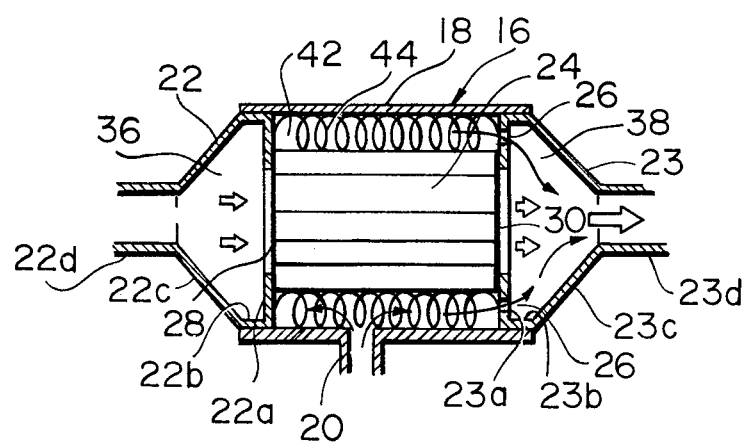
FIG. 2 is an enlarged longitudinal sectional view showing a catalytic converter forming a part of the system shown in FIG. 1.

Referring now to FIGS. 1 and 2, there is schematically illustrated an internal combustion engine, which is shown as being equipped with an exhaust gas purifying system embodying the present invention. The internal combustion engine, which is generally designated as 10, has, as customary, an exhaust gas passageway including an exhaust manifold 12 into which a secondary air distributing pipe 14 opens. The exhaust manifold 12 is connected to the exhaust gas purifying system which is generally indicated as 15. The exhaust gas purifying system 15 has a catalytic converter 16 communicating with the exhaust manifold 12.

Figure 4:
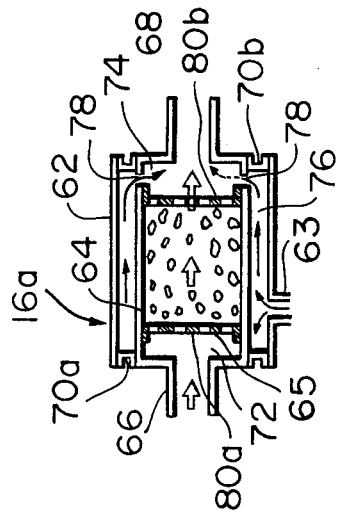
FIG. 4 is a view similar to FIG. 2 but shows a third embodiment of the catalytic converter and FIG. 5 is a view similar to FIG. 2 but shows a fourth embodiment of the catalytic converter FIG. 2.
Figure 3:
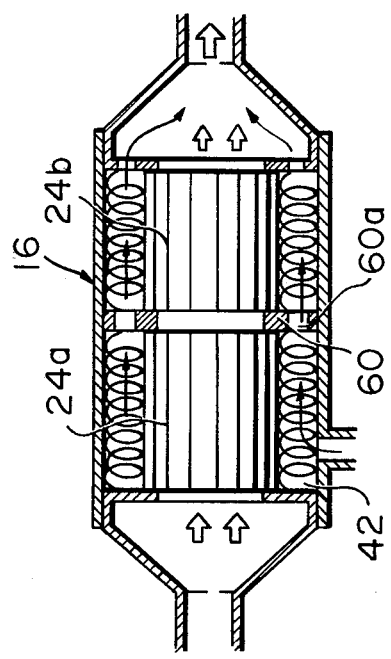
FIG. 3 is a view similar to FIG. 2 but shows a second embodiment of the catalytic converter, FIG. 2.

As shown, in FIGS. 2 to 4, converter 16 includes a cylindrical casing 18. This cylindrical casing comprises an anterior, generally conical casing 22 and a posterior, generally conical casing 23, at the axially spaced ends thereof. A catalyst bed 24 containing a catalyst is supported in the cylindrical casing 18 between the conical casings. The anterior casing 22 has a radially extending annular portion 22a, a cylindrical wall portion 22b integral therewith, a conical wall portion 22c integral with the cylindrical wall portion 22b, and an exhaust gas inlet 22d integral with the conical wall portion 22c, which communicates with the exhaust manifold 12. The anterior casing 22 defines an inlet chamber 36 therein, which communicates with the catalyst bed 24 through an opening 28 formed in the annular portion 22a. Likewise, the posterior casing 23 has a radiallly extending annular portion. This portion 23a is provided with air passages 26, a cylindrical wall portion 23b integral with the annular portion 23a, a conical wall portion 23c integral with the cylindrical portion 23b, and an outlet 23d integral with the conical wall portion 23 c and communicating with the atmosphere. The posterior casing 23 defines an outlet or reaction chamber 38 therein, which communicates with the catalyst bed 24 through an opening 30 formed in the annular portion 23a. The catalyst in the catalyst bed 24 may be of a monolithic type such as honeycomb structure, in which a large number of axially extending passages are provided. Each of the passages is coated with a catalytic material to promote oxidizing of unburned constituents of the engine exhaust gases. A temperature sensor 40 is disposed in a central portion of the catalyst bed 24 to sense the operating temperature of the catalyst and produce an electrical signal in dependence on the sensed temperature.

A cylindrical cooling chamber or passage 42 is defined between the inner periphery of the cylindrical casing 18 and the outer periphery of the catalyst bed 24, which outer periphery as indicated in FIGS. 2, 3 and 4, constitutes an imperforate wall of the catalyst. The cooling chamber 42 can be utilized for cooling the catalyst bed 24 by air passing therethrough introduced from an air inlet 20 of the passage. The cooling chamber 42 communicates with the outlet chamber 38 through apertures 26, and may also communicate with the inlet chamber 36 through similar apertures, not shown. A heat-resistant cushion 44 such as steel wool is disposed in the cooling passage 42 to elastically support the catalyst bed 24 within the casing 18.

Air enters the cooling chamber 42 from an air supplying device, generally designated as 46. This device includes a source 48 of air under pressure such as an air pump driven by the enine 10 and an electrically operable valve 50 such as a solenoid valve. The valve 50 has an inlet 50a connected to the air pump 48. This valve 50 also has an outlet 50c connected to the air inlet 20 and another outlet 50b connected to the secondary air distributing pipe 14. The valve 50 may include a solenoid and pressure responsive means such as a vacuum motor which is powered by intake manifold vacuum.

The temperature sensor 40 disposed in the catalyst bed 24 is electrically connected to a switch 54 which may be integral with the sensor 40 and is in turn electrically connected to the valve 50 through a lead 56. The switch 54 actuates the valve 50 to direct air from the air source 48 into the air inlet 20 of the catalytic converter 16 in response to the electrical signal from the temperature sensor 40.

In operation, when the temperature of the catalyst bed 24 exceeds a predetermined level such as 850°C, which is slightly lower than an undesirably high temperature above which catalytic activity degenerates, the temperature sensor 40 produces the electrical signal which is fed to the switch 54, which energizes the valve 50 to supply air from the pump 48 into the cooling passage 42 through the air inlet 20. The catalyst bed 24 is thus cooled by air flowing through the cooling passage 42. Air is normally supplied through the valve 50 into the distributing pipe 14 to promote oxidation of exhaust gas, but this supply is shut off by the valve 50 when the electrical signal is received. Air admitted into the cooling passage 42 then passes through the air passages 26 into the reaction chamber 38, in which oxidation of unburned constituents of the exhaust gases takes place to eliminate noxious and harmful compounds from engine exhaust gases.

When the catalyst bed 24 reaches a normal operating temperature, the temperature sensor 40 no longer generates the electrical signal and the valve 50 is de-energized. The valve 50 thus interrupts communication between the inlet 50a and the outlet 50c while establishing communication between the inlet 50a and the outlet 50b, through which air is supplied through the secondary air distributing pipe 14 into the exhaust manifold 12.

It should be understood that air may be supplied to the converter, by valve 50 and system 14, not only into the cooling passage 42 but also upstream of the catalyst bed 24, even during cooling of the catalyst bed 24, to accomplish more complete oxidation in the catalytic converter 16. In this manner, air may be admitted into the exhaust manifold 12 in a limited amount when the electrical signal is received by the valve 50 which does not cause an excessive rise in the operating temperature of the catalyst bed 24.

FIG. 3 shows a modified example of the catalytic converter 16. In this modification, the catalytic converter 16 is similar to that shown in FIG. 2 with the exception that it is provided with upstream and downstream portions 24a and 24b respectively, between which an annular perforated plate 60 is disposed. The plate 60 has a plurality of openings 60a which communicate with the cooling passage 42. The plate 60 prevents exhaust gases from entering the cooling passage 42.

Another modified example of a catalytic converter is shown in FIG. 4. In this modification, the catalytic converter 16a includes an outer cylindrical casing 62 which has an air inlet 63 formed through a peripheral wall thereof, an inner cylindrical casing 64 which has an exhaust gas inlet 66 and an outlet 68 at axially spaced ends, and a non-monolithic catalyst 65 such as pellet type catalyst. The inner casing 64 is fixedly supported within the outer casing 62 by means of a pair of annular support plates 70a and 70b located at the ends of the outer casing 62. The catalyst 65 is disposed within the inner casing 64. An inlet chamber 72 is defined upstream of the catalyst 65 in the inner casing 64, while an outlet or reaction chamber 74 is defined downstream of the catalyst 65 in the inner casing 64. A cooling passage 76 is defined between the inner periphery of the outer casing 62 and the outer periphery of the inner casing 64. The cooling passage 76 communicates with the outlet chamber 74 through air passages 78 formed through the peripheral wall of the inner casing 64. A pair of perforated walls 80a and 80b retain the catalyst 65 which is in the form of beads or pellets.

In operation, air pumped into the cooling passage 76 through the air inlet 63 cools the catalyst 65, and thereafter the air flows into the reaction chamber 74 through the air passages 78 to oxidize unburned constituents of the engine exhaust gases from the catalyst 65.

Figure 5:
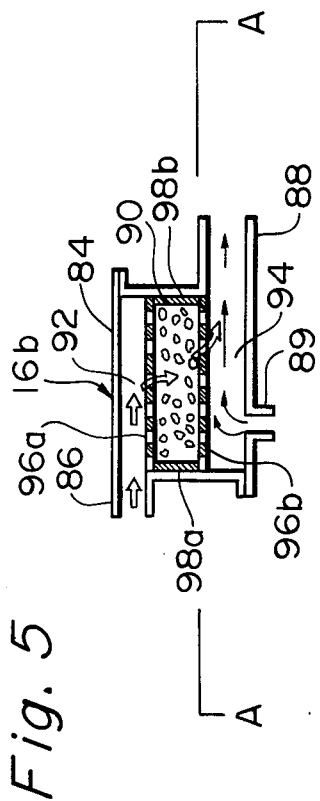

FIG. 5 shows a further modified example of a catalytic converter. In this modification, the catalytic converter 16b includes a casing 84 which has an exhaust gas inlet 86, an outlet 88, and an air inlet 89 formed through a peripheral wall thereof, and a non-monolithic catalyst 90, such as pellet type catalyst, disposed in the central portion of the casing 84. An inlet chamber 92 is defined upstream of the catalyst 90 in the casing 84, while an outlet or reaction chamber 94 is defined downstream of the catalyst 90 in the casing 84. The catalyst 90 is retained by a pair of perforated walls 96a and 96b and a pair of side walls 98a and 98b, and is in the form of beads or pellets. It should be noted in this case that the reaction chamber 94 serves for oxidizing unburned constituents of the engine exhaust gases from the catalyst 90. The reaction chamber 94 also serves as a cooling passage.

In operation, air supplied into the reaction chamber 94 through the air inlet 89 cools the catalyst 90, and thereafter oxidizes unburned constituents of the engine exhaust gases from the catalyst 90 in a downstream portion of the reaction chamber 94.

The exhaust gas inlet 86 and the outlet 88 are spaced from a longitudinal axis A—A of the casing 84, and angularly spaced from each other about the longitudinal axis A—A.

Exhaust gas thus enters the inlet chamber 92 parallel to the longitudinal axis A—A, passes through the catalyst 90 perpendicular to the longitudinal axis A—A, and leaves the outlet chamber 94 parallel to the longitudinal axis A—A. The air inlet 89 opens into the outlet chamber 94 perpendicular to the longitudinal axis A—A in a direction opposite to the flow of exhaust gas through the catalyst 90.

What is claimed is:

1. An exhaust purifying system for an engine, comprising;
   a. a catalytic converter including a casing, exhaust gas inlet means for providing communication to the casing from an exhaust passageway of an engine, an outlet from the casing communicating with the atmosphere, catalytic means disposed in the casing and including an outer peripheral wall to provide a cooling chamber disposed between an inner circumference of the casing and the outer peripheral wall of the catalytic means, means spacing said catalytic means from the inner circumference of the casing, and an air inlet communicating with the space between the inner circumference of said casing and said catalytic means;

b. means defining an upstream opening of the catalytic means communicating with the exhaust gas inlet means and defining a downstream opening of the catalytic means communicating with the outlet to provide an inlet chamber between the exhaust gas inlet and the upstream opening of the catalytic means and an outlet chamber between the outlet and the downstream opening of the catalytic means, said exhaust gas inlet and outlet chambers being disposed at mutually spaced ends of said casing and of said outer peripheral wall;

c. a source of air;

d. a valve having an inlet communicating with the source of air and having a first outlet communicating with said cooling chamber through said air inlet, whereby air passing into said cooling chamber via said air inlet is in direct heat-exchange contact with the catalytic means; and e. means, including temperature sensing means for feeding a signal to the valve when the temperature in the catalytic converter is above a predetermined level at which the activity of the catalyst means degenerates, to normally block communication between the source of air and said air inlet via the valve, and to selectively establish communication between the source of air and said air inlet via the valve in response to said electrical signal.

2. An exhaust gas purifying system according to claim 1, in which said temperature sensing means include an electrically operated temperature sensor disposed within the catalytic converter, and switch means electrically connected to said temperature sensor for electrically energizing said valve.

3. An exhaust gas purifying system according to claim 1, in which said temperature sensor is mounted on said catalytic means.

4. An exhaust gas purifying system according to claim 1, in which said valve has a second outlet communicating with said exhaust gas inlet means, said second valve outlet being normally open to establish full communication between the source of air and the exhaust gas inlet, and being selectively operable in response to said electrical signal to block communication therebetween.

5. An exhaust gas purifying system according to claim 1, in which said valve has a second outlet communicating with said exhaust gas inlet means, said second valve outlet being normally open to establish full communication between the source of air and the exhaust gas inlet, and being selectively operable in response to said electrical signal to establish limited communication therebetween.

6. An exhaust gas purifying system according to claim 1, in which said catalytic means comprises a monolithic catalyst.

7. An exhaust gas purifying system according to claim 1, in which said catalytic means comprises a particulate catalyst bed.

8. An exhaust gas purifying system according to claim 1, in which said catalytic converter includes a heat-resistant cushioning means disposed within said cooling chamber for resiliently supporting said catalytic means on the inner circumferential wall of said casing.

9. An exhaust gas purifying system according to claim 8, in which said cushioning means includes metallic wool.

10. An exhaust gas purifying system according to claim 9, in which said metallic wool consists of steel.

* * * * *